(12) United States Patent
Matsuo et al.

(10) Patent No.: US 10,356,643 B2
(45) Date of Patent: Jul. 16, 2019

(54) BASE STATION APPARATUS AND COMMUNICATION METHOD

(71) Applicant: Panasonic Intellectual Property Management Co., Ltd., Osaka (JP)

(72) Inventors: Hidenori Matsuo, Kanagawa (JP); Seigo Nakao, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/753,414

(22) PCT Filed: Aug. 10, 2016

(86) PCT No.: PCT/JP2016/003694
§ 371 (c)(1),
(2) Date: Feb. 19, 2018

(87) PCT Pub. No.: WO2017/038023
PCT Pub. Date: Mar. 9, 2017

(65) Prior Publication Data
US 2018/0249360 A1 Aug. 30, 2018

(30) Foreign Application Priority Data
Sep. 2, 2015 (JP) .................. 2015-173077

(51) Int. Cl.
*H04W 36/30* (2009.01)
*H04W 24/08* (2009.01)
(Continued)

(52) U.S. Cl.
CPC ............ *H04W 24/10* (2013.01); *H04W 8/24* (2013.01); *H04W 24/02* (2013.01);
(Continued)

(58) Field of Classification Search
CPC ........ H04W 24/10; H04W 24/08; H04W 8/24
See application file for complete search history.

(56) References Cited

U.S. PATENT DOCUMENTS 5,924,042 A * 7/1999 Sakamoto ............. H04W 68/06
340/7.27
8,681,753 B2 * 3/2014 Kokkinen ........... B61L 15/0027
370/328
(Continued)

OTHER PUBLICATIONS

International Search Report of PCT application No. PCT/JP2016/003694 dated Sep. 27, 2016.
(Continued)

*Primary Examiner* — Rasheed Gidado
(74) *Attorney, Agent, or Firm* — Seed IP Law Group LLP

(57) ABSTRACT

A base station apparatus includes a traffic determination unit, a parameter generator and a setting information transmitter. The traffic determination unit determines whether a traffic amount is larger than a threshold. The parameter generator generates, when the traffic amount is larger than the threshold, indicator information indicating to the terminal to use a parameter set to a parameter region corresponding to a highest moving speed in mobility parameters to which a parameter decreasing with increasing moving speed of the terminal is set to a plurality of parameter regions respectively corresponding to a plurality of moving speeds of the terminal. The setting information transmitter transmits the indicator information to at least one terminal.

14 Claims, 9 Drawing Sheets

(51) Int. Cl.
    *H04W 24/10*     (2009.01)
    *H04W 36/22*     (2009.01)
    *H04W 8/24*     (2009.01)
    *H04W 36/00*     (2009.01)
    *H04W 24/02*     (2009.01)
    *H04W 36/32*     (2009.01)

(52) U.S. Cl.
    CPC ....... *H04W 36/0088* (2013.01); *H04W 36/22* (2013.01); *H04W 24/08* (2013.01); *H04W 36/00837* (2018.08); *H04W 36/30* (2013.01); *H04W 36/32* (2013.01)

(56) References Cited

U.S. PATENT DOCUMENTS

2012/0123660 A1* 5/2012 Kagawa ................ B60W 30/16
    701/96
2013/0273917 A1* 10/2013 Sfar ................ H04W 36/0094
    455/436

OTHER PUBLICATIONS

3GPP TS36.331 V12A.1, "3rd Generation Partnership Project; Technical Specification Group Radio Access Network; Evolved Universal Terrestrial Radio Access (E-UTRA); Radio Resource Control (RRC); Protocol specification (Releae 12)", Dec. 2014.

\* cited by examiner

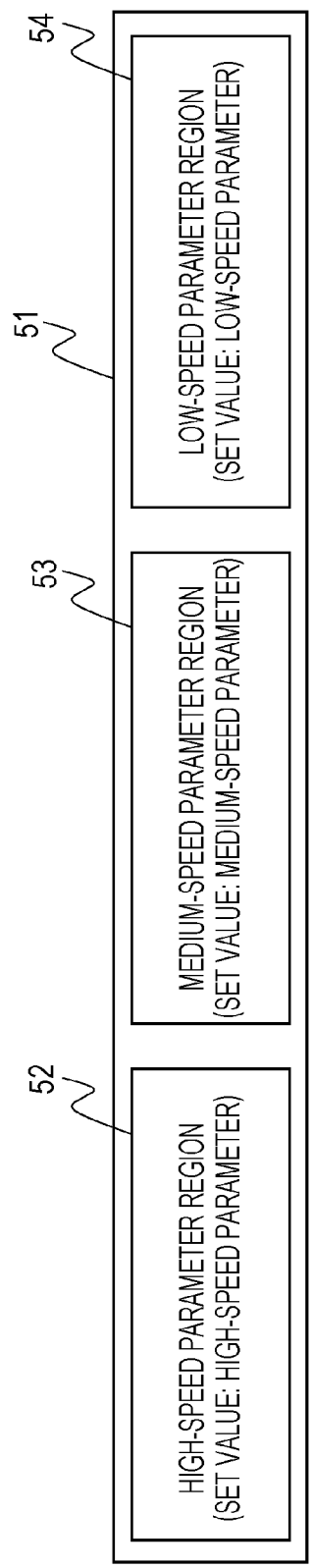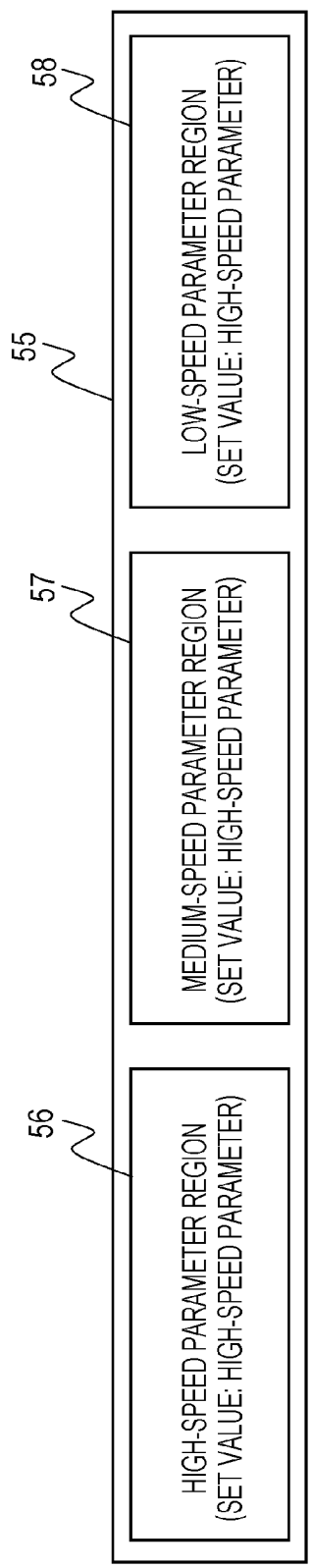

BASE STATION APPARATUS AND COMMUNICATION METHOD

This application is a U.S. national stage application of the PCT International Application No. PCT/JP2016/003694 filed on Aug. 10, 2016, which claims the benefit of foreign priority of Japanese patent application 2015-173077 filed on Sep. 2, 2015, the contents all of which are incorporated herein by reference.

TECHNICAL FIELD

The present invention relates to a base station apparatus and a communication method.

BACKGROUND ART

In a system in which a base station apparatus and a terminal perform radio communication, handover control is performed under which the terminal switches a connection between the neighbour base station apparatus in order to perform high-quality communication.

The handover may frequently occur for the terminal connected to the base station apparatus at an edge (cell edge) of a cell, which is a communicable range of the base station apparatus. Particularly, a phenomenon of frequent occurrence of the handover, namely, a phenomenon called ping-pong occurs when the terminal moves at a low speed.

For a high-speed terminal of which the moving speed is relatively high, a change of a propagation path is large, and a change of reception quality often occurs due to the large change of the propagation path. Thus, the probability of occurrence of the ping-pong is low. On the other hand, for a low-speed terminal of which the moving speed is relatively low, the change of the propagation path is small, and the change of the reception quality rarely occurs due to the small change of the propagation path. Thus, the probability of causing the ping-pong is high.

For example, NPL 1 discloses a radio communication system in which the base station apparatus determines the handover of the terminal to the neighbour base station apparatus based on reception quality information indicating the reception quality of the neighbour base station apparatus, which is measured by the terminal. According to the technique disclosed in NPL 1, a 3GPP standardization organization establishes a function in which the terminal waits the transmission of the reception quality information to the base station apparatus for a certain period of time (called time to trigger (hereinafter, referred to as TTT)) so that the handover does not frequently occur for the terminal connected to the base station apparatus at the cell edge.

A parameter deciding TTT is referred to as a mobility parameter. For the mobility parameter established by the 3GPP standardization organization, three ways of parameters, namely, a high-speed parameter, a medium-speed parameter longer than the high-speed parameter, and a low-speed parameter longer than the medium-speed parameter are set according to the moving speed of the terminal. The terminal sets the parameter corresponding to the moving speed of itself from the mobility parameter as the parameter determining the handover. The terminal waits the notification to the base station apparatus of the reception quality information for time indicated by the set parameter, and the terminal notifies the base station apparatus of the reception quality information after the time indicated by the parameter elapses.

The function enables the terminal to wait the transmission of the reception quality information according to the moving speed. For example, because the low-speed parameter is set relatively longer, repetition of the handover can be suppressed even if the low-speed terminal is located at the cell edge. Because the high-speed parameter is set relatively shorter, even if the high-speed terminal moves to an outside of the cell at high speed, it can avoid a delay in start of the handover to the neighbour base station apparatus and the disconnection of the connection.

CITATION LIST

Non-Patent Literature

NPL 1: 3GPP TS36.331 v12.4.1

SUMMARY OF THE INVENTION

The present invention provides a base station apparatus and a communication method each capable of immediately dispersing a load of the base station apparatus.

A first aspect of the present invention provides a base station apparatus that performs radio communication with a terminal. The base station apparatus includes a traffic determination unit, a parameter generator, and a setting information transmitter. The traffic determination unit determines whether a traffic amount is larger than a threshold. The parameter generator performs first setting in which a parameter decreasing with increasing moving speed of the terminal is set to a plurality of parameter regions provided in a mobility parameter and respectively corresponding to a plurality of moving speeds of the terminal, when the traffic amount is lower than or equal to the threshold. The parameter generator performs second setting in which a smallest parameter in parameters set in the first setting is set to each of the plurality of parameter regions irrespective of the moving speeds of the terminal when the traffic amount is larger than the threshold. The setting information transmitter transmits a terminal specific message including the mobility parameter set by the parameter generator to the terminal.

A second aspect of the present invention provides a base station apparatus that performs radio communication with a terminal. The base station apparatus includes a traffic determination unit, a parameter generator, and a setting information transmitter. The traffic determination unit determines whether a traffic amount is larger than a threshold. The parameter generator generates indicator information indicating to the terminal to use a parameter set to a parameter region corresponding to a highest moving speed in mobility parameters in which a parameter decreasing with increasing moving speed of the terminal is set to a plurality of parameter regions respectively corresponding to a plurality of moving speeds of the terminal when the traffic amount is larger than the threshold. The setting information transmitter transmits the indicator information to at least one terminal.

A third aspect of the present invention provides a communication method in a base station apparatus that performs radio communication with a terminal. The communication method includes determining whether a traffic amount is larger than a threshold. The communication method includes performing first setting in which a parameter decreasing with increasing moving speed of the terminal is set to a plurality of parameter regions provided in a mobility parameter and respectively corresponding to a plurality of moving speeds of the terminal when the traffic amount is lower than or equal to the threshold. The communication method includes performing second setting in which a smallest parameter in the parameters set in the first setting is set to each of the plurality of parameter regions irrespective of the moving speed of the terminal when the traffic amount is larger than the threshold. The communication method includes transmitting a terminal specific message including the set mobility parameter to the terminal.

A fourth aspect of the present invention provides a communication method in a base station apparatus that performs radio communication with a terminal. The communication method includes determining whether a traffic amount is larger than a threshold. The communication method includes generating indicator information indicating to the terminal to use a parameter set to a parameter region corresponding to a highest moving speed in mobility parameters in which a parameter decreasing with increasing moving speed of the terminal is set to a plurality of parameter regions respectively corresponding to a plurality of moving speeds of the terminal when the traffic amount is larger than the threshold. The communication method includes transmitting the indicator information to at least one terminal.

BRIEF DESCRIPTION OF DRAWINGS

FIG. 5A is a diagram illustrating an example of a conventional mobility parameter.

FIG. 5B is a diagram illustrating an example of a mobility parameter in the first exemplary embodiment of the present invention.

DESCRIPTION OF EMBODIMENTS (Circumstances Related to how the Present Invention has Been Conceived)

First, circumstances related to how the present invention has been conceived will be described.

Figure 1:
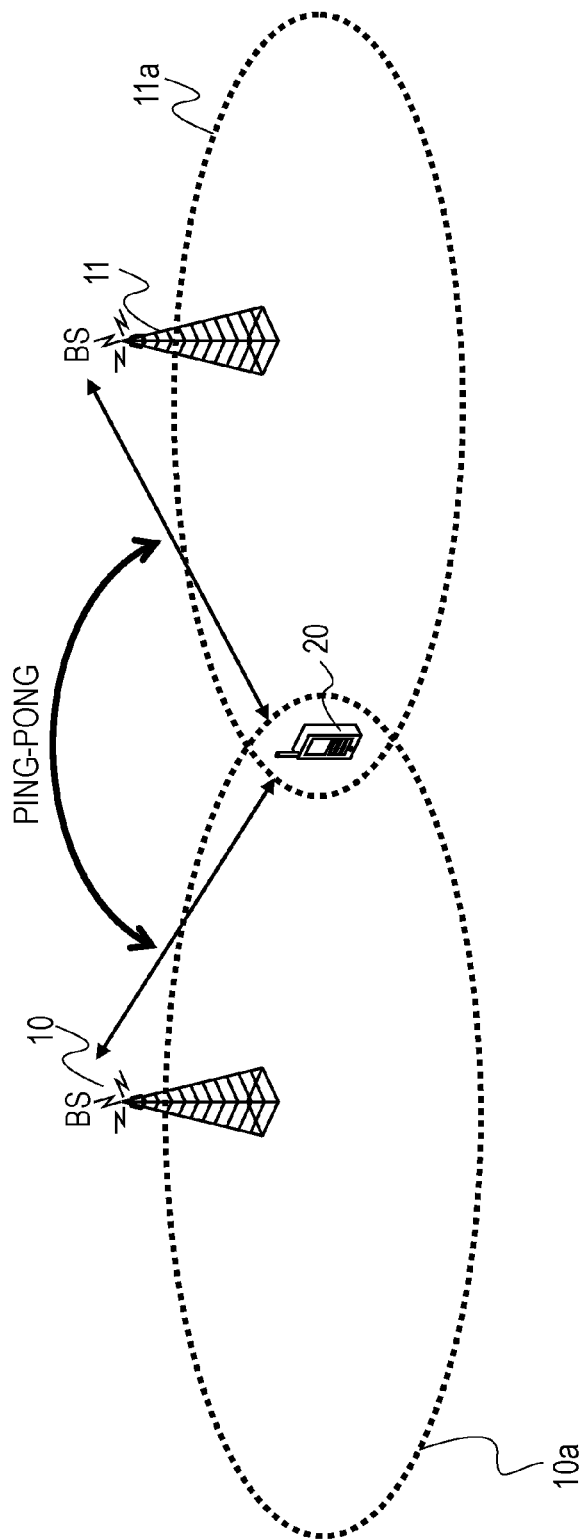
FIG. 1 is a view illustrating an example of a communication state between a terminal and a base station apparatus.

FIG. 1 is a view illustrating an example of a communication state between terminal 20 and base station apparatuses 10, 11. Two base station apparatuses 10 and 11 and terminal 20 located at cell edges of base station apparatus 10 and 11 are illustrated in FIG. 1.

Terminal 20 measures reception quality with base station apparatus 10 and reception quality with base station apparatus 11. For example, terminal 20 performs the connection to the base station apparatus having higher measured reception quality.

For example, it is assumed that terminal 20 is connected to base station apparatus 11. At this point, when the reception quality with base station apparatus 10 becomes higher than the reception quality with base station apparatus 11 because a communication environment is changed, for example, by the movement of terminal 20, terminal 20 performs the handover switching the connection target from base station apparatus 11 to base station apparatus 10.

However, as illustrated in FIG. 1, when terminal 20 is located at the cell edge of cell 10a of base station apparatus 10 and the cell edge of cell 11a of base station apparatus 11, the reception quality with base station apparatus 10 and the reception quality with base station apparatus 11 become substantially identical to each other. In such cases, for terminal 20, the phenomenon of frequent occurrence of the handover, namely, the phenomenon called ping-pong occurs between terminal base station apparatus 10 and base station apparatus 11.

For a high-speed terminal of which a moving speed is high, a change of a propagation path is relatively large, and a change of reception quality occurs easily due to the large change of the propagation path. Therefore, there is a low probability of causing the ping-pong. On the other hand, for a low-speed terminal of which the moving speed is low, the change of the propagation path is relatively small, and the change of the reception quality occurs hardly due to the small change of the propagation path. Therefore, there is a high probability of causing the ping-pong.

In the 3GPP standardization organization, a mobility parameter (or time to trigger (TTT)) is established in order to prevent the ping-pong.

The mobility parameter (or TTT) is time until the base station apparatus is notified of (a measurement report) reception quality information indicating the reception quality of the measured base station since the reception quality of the base station apparatus measured by the terminal satisfies a handover condition. The base station apparatus is notified of the mobility parameter by a terminal specific message (RRC connection reconfiguration message) transmitted in each terminal.

When the traffic amount of the base station apparatus increases to become a high traffic state, it is necessary for the base station apparatus to offload the traffic onto the neighbour base station apparatus. Particularly, it is necessary for the base station apparatus in the high traffic state to offload the traffic onto the neighbour base station apparatus by quickly handing over the low-speed terminal onto the neighbour base station apparatus, the low-speed terminal being connected for a longer time compared with the high-speed terminal immediately handed over to the neighbour base station apparatus due to the high-speed movement of the terminal.

However, because of long TTT (low-speed parameter) for the low-speed terminal, the measurement report to the base station apparatus is delayed, and a trigger of the handover is delayed. The delay causes disconnection of the low-speed terminal, for example, when a system of changing a cell coverage is adopted in order to offload the traffic. The disconnection of the low-speed terminal in the cell coverage changing system will be described below with reference to the drawing.

Figure 2:
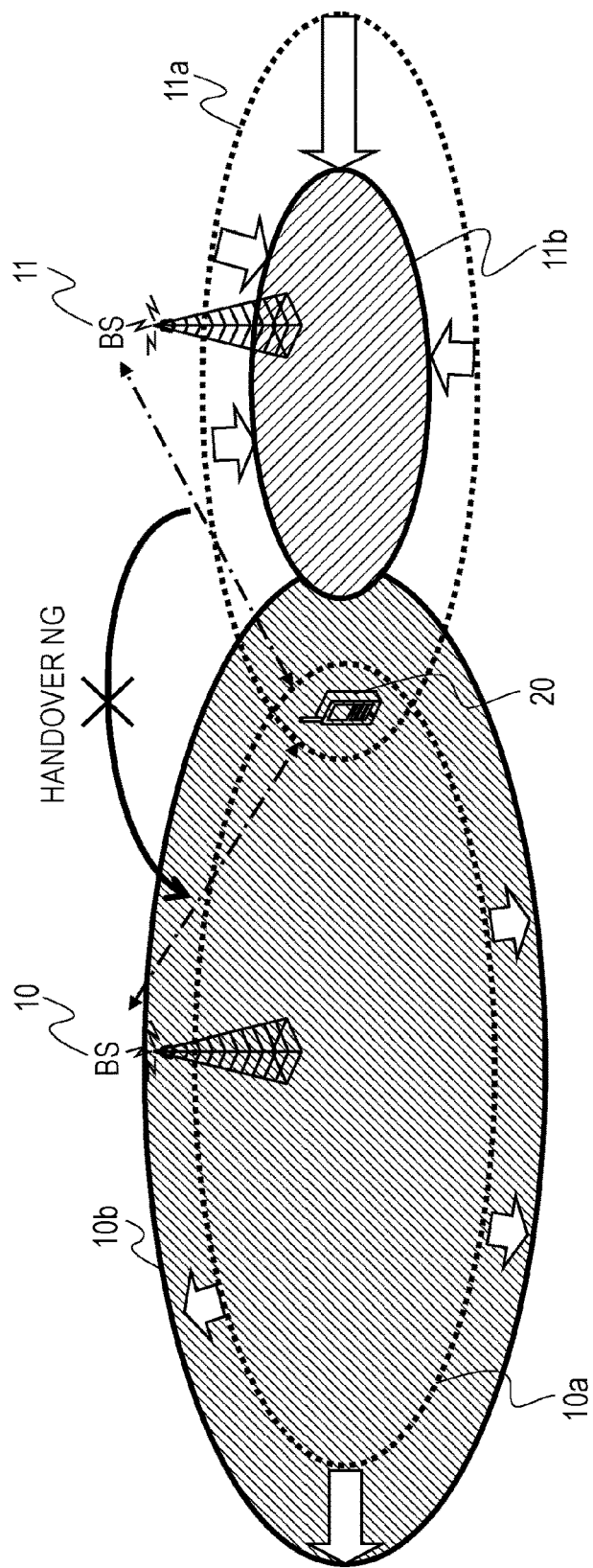
FIG. 2 is a view illustrating an example of the communication state when the base station apparatus changes a cell coverage.

FIG. 2 is a view illustrating an example of the communication state when the base station apparatuses 10, 11 change the cell coverage. FIG. 2 illustrates reduction of the cell coverage of base station apparatus 11 from cell 11a to cell 11b because base station apparatus 11 becomes the high traffic state. Then, the cell coverage of base station apparatus 10 is enlarged from cell 10a to cell 10b in conjunction with the change of the cell coverage of base station apparatus 11. It is assumed that terminal 20 is connected to base station apparatus 11 before the change of the cell coverage.

When the cell coverage is changed as illustrated in FIG. 2, the cell of base station apparatus 11 is reduced and terminal 20 is out of the cell coverage. Therefore, it is necessary for terminal 20 to perform the handover from currently-connected base station apparatus 11 to base station apparatus 10 that is the neighbour base station apparatus.

However, when terminal 20 is the low-speed terminal, the notification of the measurement report for the handover is delayed because of long TTT (low-speed parameter) for the low-speed terminal. As a result, the handover to base station apparatus 10 cannot be performed, and there is a probability of the disconnection of the connection.

In consideration of such situations, the present invention provides a base station apparatus and a communication method each capable of maintaining the connection of the low-speed terminal by immediately handing over the low-speed terminal located at the cell edge when the base station apparatus in the high traffic state reduces the cell coverage in order to offload the traffic of the base station apparatus.

Hereinafter, exemplary embodiments of the present invention will be described in detail with reference to the drawings. The following exemplary embodiments are an example, but the present invention is not limited to the exemplary embodiments.

First Exemplary Embodiment

A configuration of base station apparatus 30 according to a first exemplary embodiment of the present invention will be described with reference to FIG. 3.

Figure 3:
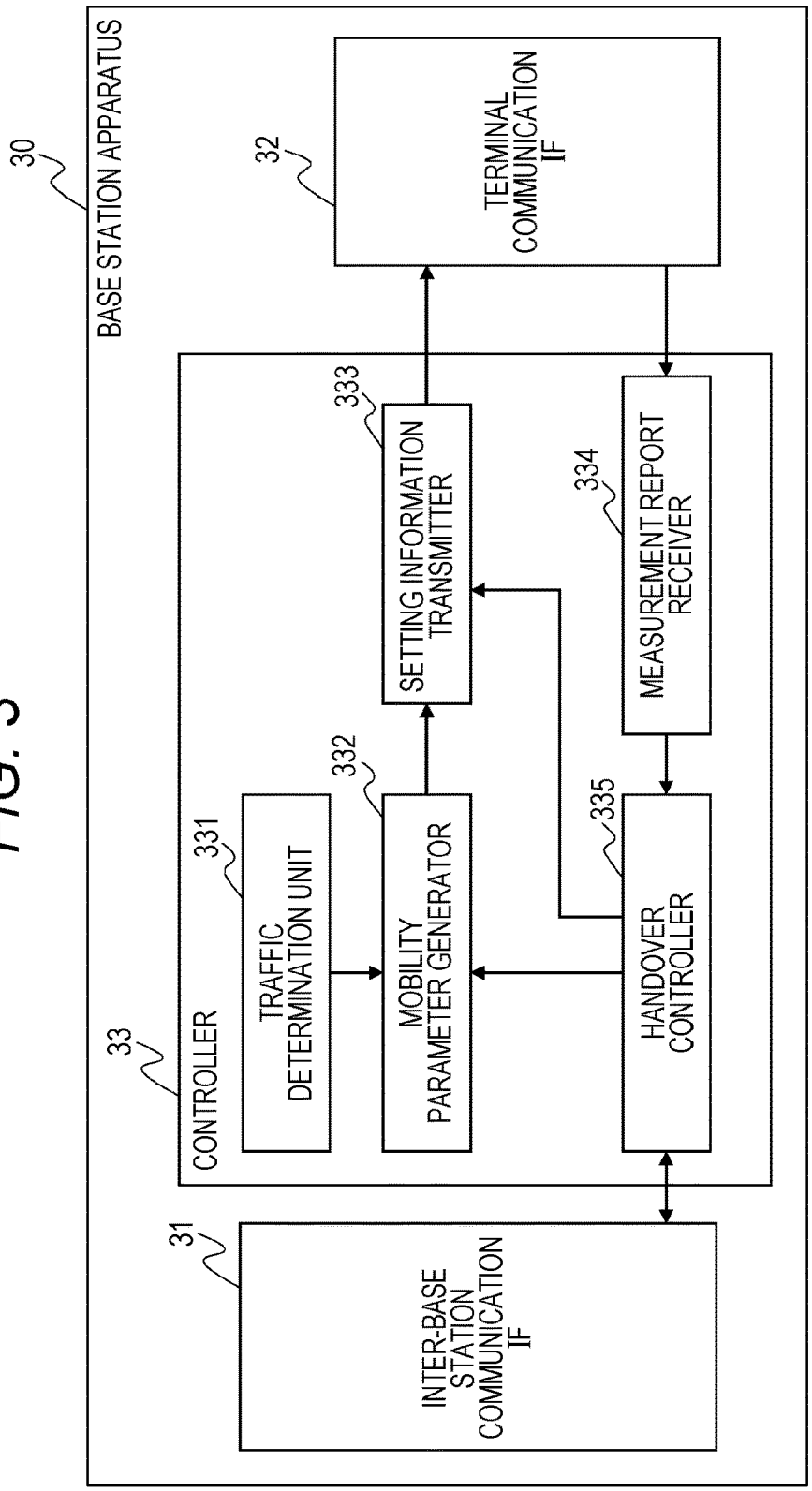
FIG. 3 is a diagram illustrating an example of a configuration of a base station apparatus according to a first exemplary embodiment of the present invention.

FIG. 3 is a diagram illustrating an example of a configuration of base station apparatus 30 according to the first exemplary embodiment of the present invention. Base station apparatus 30 includes inter-base station communication IF (interface) 31, terminal communication IF (interface) 32, and controller 33.

Inter-base station communication IF 31 is an interface that performs communication between base station apparatus 30 and other base station apparatuses including the neighbour base station apparatus located in the neighbour.

Terminal communication IF 32 is an interface that performs communication between base station apparatus 30 and the terminal located within the cell of base station apparatus 30.

Controller 33 includes traffic determination unit 331, mobility parameter generator 332, setting information transmitter 333, measurement report receiver 334, and handover controller 335.

Traffic determination unit 331 determines whether base station apparatus 30 is in a high traffic state. For example, traffic determination unit 331 compares the traffic amount accommodated in base station apparatus 30 to a predetermined threshold, and determines that base station apparatus 30 is in the high traffic state when the traffic amount is larger than the predetermined threshold. Traffic determination unit 331 outputs a determination result to mobility parameter generator 332.

Mobility parameter generator 332 generates the mobility parameter based on the determination result. Mobility parameter generator 332 generates the mobility parameter when receiving the notification of completion of the handover from handover controller 335 described later.

The mobility parameter has a region where the parameter is set according to the moving speed (for example, the high-speed terminal, the medium-speed terminal, or the low-speed terminal) of the terminal. For example, the mobility parameter has a high-speed parameter region where the high-speed parameter is set, a medium-speed parameter region where the medium-speed parameter is set, and a low-speed parameter region where the low-speed parameter is set. Mobility parameter generator 332 generates the mobility parameter by setting the parameter to each parameter region. A specific example of the mobility parameter generated by mobility parameter generator 332 will be described in detail later.

Mobility parameter generator 332 outputs a terminal specific message including the generated mobility parameter to setting information transmitter 333.

Setting information transmitter 333 receives, from handover controller 335, information about the reception quality between the neighbour base station apparatus and the terminal, and determines, based on the received information, the terminal located at the cell edge. Setting information transmitter 333 transmits the terminal specific message received from mobility parameter generator 332 to the terminal located at the cell edge of base station apparatus 30 through terminal communication IF 32.

Measurement report receiver 334 receives the measurement report from the terminal through terminal communication IF 32, and outputs the received measurement report to handover controller 335.

Based on measurement report, handover controller 335 performs handover control on the terminal to which the measurement report is transmitted. Specifically, handover controller 335 determines a handover target base station apparatus based on the reception quality of the neighbour base station apparatus, which is included in the measurement report. Handover controller 335 performs communication with handover controller 335 of the handover target base station apparatus, transmits and receives information about the terminal to be handed over to and from handover controller 335 of the handover target base station apparatus, and completes the handover of the terminal.

When the handover control is completed, handover controller 335 outputs the notification of the completion to mobility parameter generator 332. Handover controller 335 receives information about the reception quality between the neighbour base station apparatus and the terminal through inter-base station communication IF 31, and outputs the received information to setting information transmitter 333.

Handover controller 335 may change the cell coverage together with the handover control. In this case, handover controller 335 transmits and receives information to and from the neighbour base station apparatus, and reduces and enlarges the cell coverage of base station apparatus 30.

Figure 4:
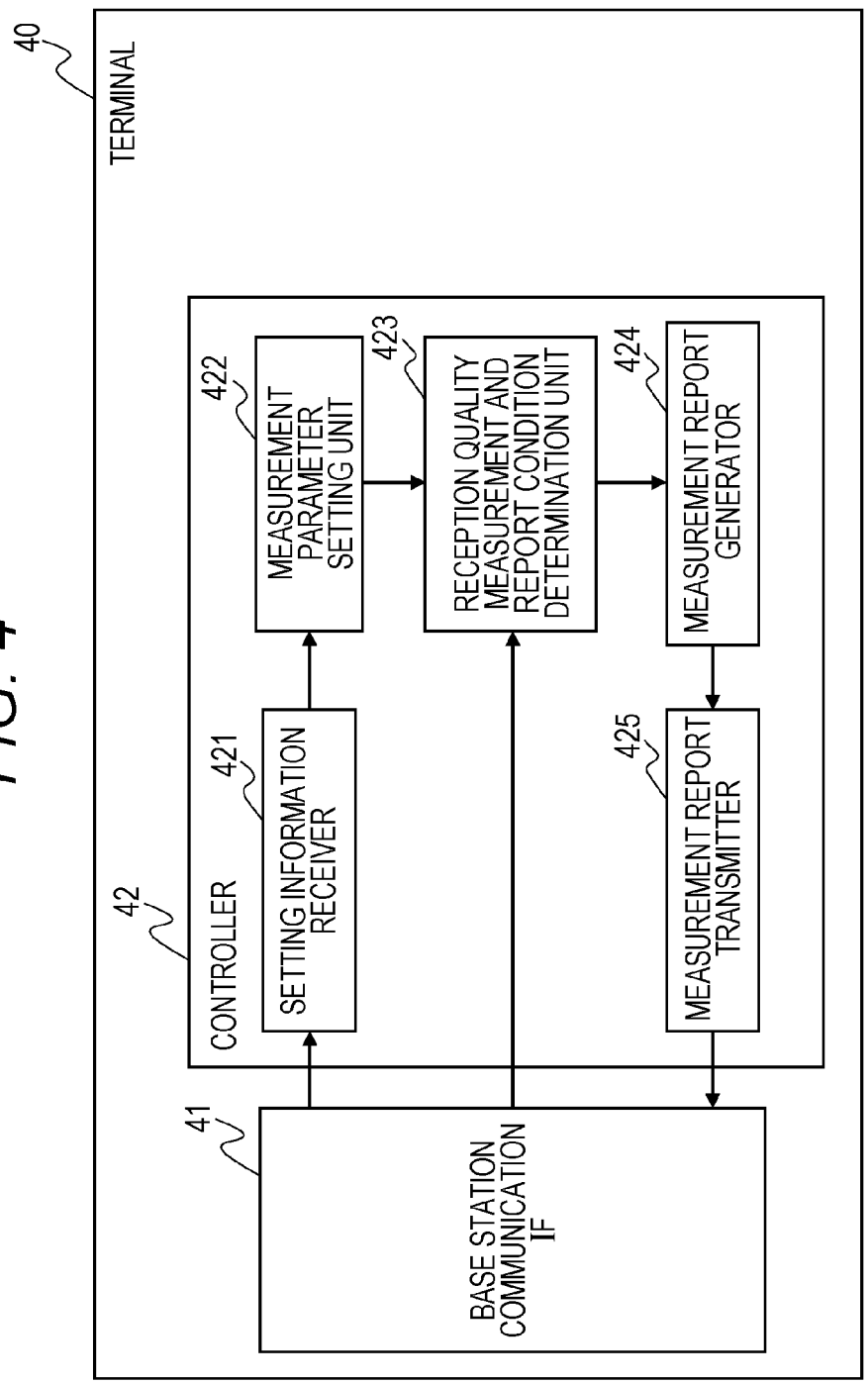
FIG. 4 is a diagram illustrating an example of a configuration of a terminal according to the first exemplary embodiment of the present invention.

FIG. 4 is a diagram illustrating an example of a configuration of terminal 40 according to the first exemplary embodiment of the present invention. Terminal 40 includes base station communication IF 41 and controller 42.

Base station communication IF 41 is an interface that performs communication between terminal 40 and base station apparatus 30.

Controller 42 in FIG. 4 includes setting information receiver 421, measurement parameter setting unit 422, reception quality measurement and report condition determination unit 423, measurement report generator 424, and measurement report transmitter 425.

Setting information receiver 421 receives setting information, which is transmitted from base station apparatus 30, through base station communication IF 41. For example, setting information receiver 421 receives the terminal specific message including the mobility parameter as the setting information. Setting information receiver 421 outputs the terminal specific message including the received mobility parameter to measurement parameter setting unit 422.

Measurement parameter setting unit 422 receives the moving speed of terminal 40 from a moving speed determination unit (not illustrated). The moving speed of terminal 40 received by measurement parameter setting unit 422 is classified, for example, into three ways, namely, the low-speed terminal of which the moving speed of terminal 40 is low, the medium-speed terminal higher than the low-speed terminal, and the high-speed terminal higher than the medium-speed terminal.

Measurement parameter setting unit 422 sets a measurement parameter based on the mobility parameter included in the received terminal specific message and the moving speed. The measurement parameter is a parameter for time used in determining whether terminal 40 satisfies a measurement report condition.

For example, when determining that terminal 40 is the low-speed terminal, measurement parameter setting unit 422 sets a value set to the low-speed parameter region of the mobility parameter to the measurement parameter. When determining that terminal 40 is the medium-speed terminal, measurement parameter setting unit 422 sets a value set to the medium-speed parameter region of the mobility parameter to the measurement parameter. When determining that terminal 40 is the high-speed terminal, measurement parameter setting unit 422 sets a value set to the high-speed parameter region of the mobility parameter to the measurement parameter.

Measurement parameter setting unit 422 outputs the set measurement parameter to reception quality measurement and report condition determination unit 423.

Reception quality measurement and report condition determination unit 423 measures the reception quality of the base station apparatus currently connected to terminal 40 through base station communication IF 41 and the reception quality of the neighbour base station apparatus that is not connected to terminal 40.

Reception quality measurement and report condition determination unit 423 determines whether the measurement report condition is satisfied based on each measured reception quality. For example, when a state—in which a difference between the reception quality of the base station apparatus not connected to terminal 40 and the reception quality of the base station apparatus currently connected to terminal 40 is larger than a predetermined value—is maintained for time of the measurement parameter, reception quality measurement and report condition determination unit 423 determines that the measurement report condition is satisfied.

When determining that the measurement report condition is satisfied, reception quality measurement and report condition determination unit 423 outputs a determination result to measurement report generator 424. Reception quality measurement and report condition determination unit 423 outputs a result of the measured reception quality to measurement report generator 424.

When receiving the determination result indicating that the measurement report condition is satisfied, measurement report generator 424 generates the measurement report (reception quality measurement result). Measurement report generator 424 outputs the generated measurement report to measurement report transmitter 425.

Measurement report transmitter 425 transmits the received measurement report to base station apparatus 30 through base station communication IF 41.

The mobility parameter generated by mobility parameter generator 332 will be described below.

FIG. 5A is a diagram illustrating an example of conventional mobility parameter 51. FIG. 5B is a diagram illustrating an example of mobility parameter 55 in the first exemplary embodiment of the present invention.

As illustrated in FIG. 5A, conventional mobility parameter 51 has high-speed parameter region 52 where the high-speed parameter is set, medium-speed parameter region 53 where the medium-speed parameter is set, and low-speed parameter region 54 where the low-speed parameter is set. As illustrated in FIG. 5B, similarly to conventional mobility parameter 51 in FIG. 5A, mobility parameter 55 of the present exemplary embodiment has high-speed parameter region 56 where the high-speed parameter is set, medium-speed parameter region 57 where the medium-speed parameter is set, and low-speed parameter region 58 where the low-speed parameter is set.

That is, a format of mobility parameter 55 according to the present exemplary embodiment is similar to a format of conventional mobility parameter 51.

Mobility parameter generator 332 of base station apparatus 30 generates conventional mobility parameter 51 in FIG. 5A when receiving the determination result indicating that the traffic amount is lower than or equal to the predetermined threshold (that is, the traffic amount is not in the high traffic state) from traffic determination unit 331. Specifically, mobility parameter generator 332 sets a value of the high-speed parameter to high-speed parameter region 52, sets a value of the medium-speed parameter to medium-speed parameter region 53, and sets a value of the low-speed parameter to low-speed parameter region 54 (first setting). Mobility parameter generator 332 outputs generated mobility parameter 51 to setting information transmitter 333.

On the other hand, mobility parameter generator 332 of base station apparatus 30 generates mobility parameter 55 of the present exemplary embodiment in FIG. 5B when receiving the determination result indicating that the traffic amount is larger than the predetermined threshold (that is, the traffic amount is in the high traffic state) from traffic determination unit 331. Specifically, mobility parameter generator 332 sets the value of the high-speed parameter to high-speed parameter region 56, sets the value of the high-speed parameter to medium-speed parameter region 57, and sets the value of the high-speed parameter to low-speed parameter region 58 (second setting). That is, mobility parameter generator 332 sets the value of the high-speed parameter to all the parameter regions, which are provided according to the moving speed of the terminal. Mobility parameter generator 332 outputs generated mobility parameter 55 to setting information transmitter 333.

Setting information transmitter 333 transmits the terminal specific message including received mobility parameter 51 or the terminal specific message including received mobility parameter 55 to terminal 40 through terminal communication IF 32. At this point, it is not necessary for base station apparatus 30 to transmit information indicating which one of mobility parameter 51 and mobility parameter 55 is included in the terminal specific message.

A measurement parameter setting method in measurement parameter setting unit 422 of terminal 40 will be described below with reference to FIGS. 5A and 5B.

For example, when receiving conventional mobility parameter 51 in FIG. 5A, measurement parameter setting unit 422 sets the value of the high-speed parameter set to high-speed parameter region 52 to the measurement parameter when terminal 40 is the high-speed terminal. Similarly, measurement parameter setting unit 422 sets the value of the medium-speed parameter set to medium-speed parameter region 53 to the measurement parameter when terminal 40 is the medium-speed terminal. Measurement parameter setting unit 422 sets the value of the low-speed parameter set to low-speed parameter region 54 to the measurement parameter when terminal 40 is the low-speed terminal.

That is, when receiving conventional mobility parameter 51 in FIG. 5A, measurement parameter setting unit 422 sets the parameter value corresponding to the moving speed of the terminal to the measurement parameter.

On the other hand, when receiving mobility parameter 55 of the present exemplary embodiment in FIG. 5B, measurement parameter setting unit 422 sets the value of the high-speed parameter set to high-speed parameter region 56 to the measurement parameter when terminal 40 is the high-speed terminal. Measurement parameter setting unit 422 sets the value of the high-speed parameter set to medium-speed parameter region 57 to the measurement parameter even if terminal 40 is the medium-speed terminal. Measurement parameter setting unit 422 sets the value of the high-speed parameter set to low-speed parameter region 58 to the measurement parameter even if terminal 40 is the low-speed terminal.

That is, when receiving mobility parameter 55 of the present exemplary embodiment in FIG. 5B, measurement parameter setting unit 422 sets the value of the high-speed parameter to the measurement parameter irrespective of the moving speed of terminal 40. At this point, measurement parameter setting unit 422 can set the value of the high-speed parameter to the measurement parameter through processing similar to processing of setting measurement parameter based on conventional mobility parameter 51.

Description will be given below of a procedure of handover processing in the present exemplary embodiment when the base station apparatus in the high traffic state hands over the terminal located at the cell edge to the neighbour base station apparatus.

Figure 6:
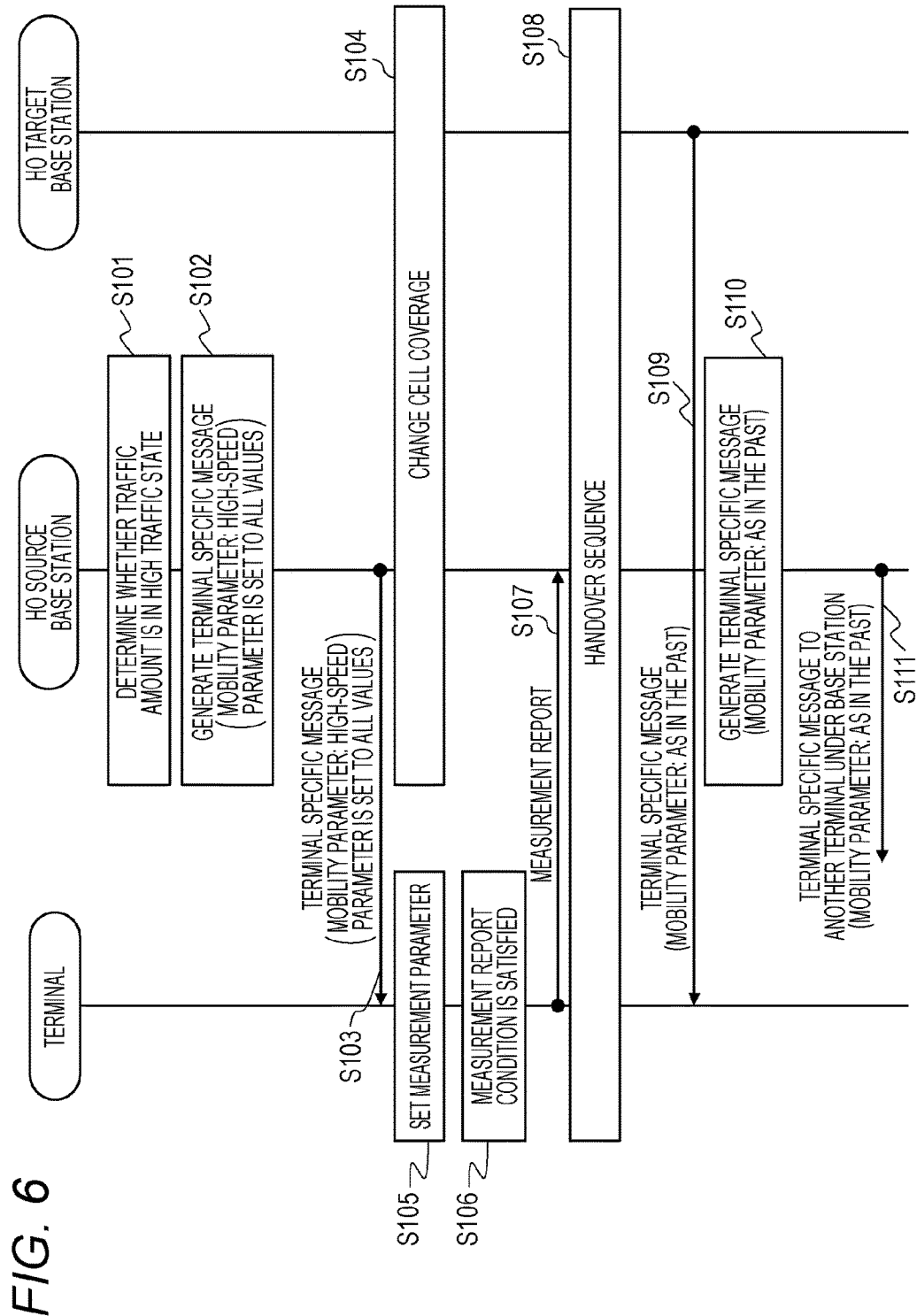
FIG. 6 is a sequence diagram illustrating a procedure of handover processing in the first exemplary embodiment of the present invention.

FIG. 6 is a sequence diagram illustrating an example of the procedure of the handover processing in the first exemplary embodiment of the present invention. FIG. 6 illustrates processing procedures of a terminal, a base station apparatus (in FIG. 6, HO (handover) source base station apparatus) connected to the terminal, and a base station apparatus (in FIG. 6, HO (handover) target base station apparatus) to which the terminal is newly connected by the handover. Each of the HO source base station apparatus and HO target base station apparatus in FIG. 6 has the configuration of base station apparatus 30 in FIG. 3, and the terminal has the configuration of terminal 40 in FIG. 4.

In the example of FIG. 6, traffic determination unit 331 of the HO source base station apparatus determines that the traffic amount is in the high traffic state (S101). Traffic determination unit 331 outputs a determination result indicating that the HO source base station apparatus is in the high traffic state to mobility parameter generator 332.

Because mobility parameter generator 332 receives the determination result indicating that the HO source base station apparatus is in the high traffic state, as illustrated in FIG. 5B, mobility parameter generator 332 generates the terminal specific message including the mobility parameter, in which the value of the high-speed parameter is set to all the parameter regions of the mobility parameter provided according to the moving speed of the terminal (S102). Mobility parameter generator 332 outputs the terminal specific message including the generated mobility parameter to setting information transmitter 333.

Setting information transmitter 333 transmits the received terminal specific message to the terminal through terminal communication IF 32 (S103).

The HO source base station apparatus and the HO target base station apparatus transmit and receive information to and from each other, and change the cell coverage (S104). For example, as illustrated in FIG. 2, the HO source base station apparatus reduces the cell size, and the HO target base station apparatus enlarges the cell size.

In the mobility parameter received through base station communication IF 41 and setting information receiver 421, measurement parameter setting unit 422 of the terminal sets the parameter set to the parameter region corresponding to the moving speed of terminal 40 to the measurement parameter (S105). At this point, as indicated in S102 and S103, in the mobility parameter transmitted from the HO source base station apparatus, the value of the high-speed parameter is set to all the parameter regions. Therefore, measurement parameter setting unit 422 sets the high-speed parameter to the measurement parameter, for example, even if terminal 40 is the low-speed terminal or the medium-speed terminal.

Then, in the example of FIG. 6, reception quality measurement and report condition determination unit 423 of the terminal determines that the measurement report condition is satisfied (S106).

Measurement report generator 424 generates the measurement report. Measurement report transmitter 425 receives the measurement report from measurement report generator 424, and transmits the measurement report to the HO source base station apparatus through base station communication IF 41 (S107).

In the example of FIG. 6, because the high-speed parameter is used as the measurement parameter, in reception quality measurement and report condition determination unit 423, time until the measurement report is transmitted to the HO source base station apparatus since the determination is started becomes a relatively short time.

Handover controller 335 of the HO source base station apparatus receives the measurement report through terminal communication IF 32 and measurement report receiver 334, and performs handover sequence control (S108). At this point, handover controller 335 determines the HO target base station apparatus based on the reception quality of the neighbour base station apparatus, which is included in the measurement report. Handover controller 335 of the HO source base station apparatus performs communication with handover controller 335 of the HO target base station apparatus, transmits and receives information about terminal 40 to and from handover controller 335 of the HO target base station apparatus, and completes the handover of terminal 40.

After terminal 40 is handed over from the HO source base station apparatus to the HO target base station apparatus by the completion of the handover sequence control, mobility parameter generator 332 of the HO target base station apparatus generates the terminal specific message including the conventional mobility parameter as illustrated in FIG. 5A. Setting information transmitter 333 of the HO target base station apparatus transmits the terminal specific message including the mobility parameter generated by mobility parameter generator 332 to terminal 40 through terminal communication IF 32 (S109).

On the other hand, after terminal 40 is handed over from the HO source base station apparatus to the HO target base station apparatus by the completion of the handover sequence control, mobility parameter generator 332 of the HO source base station apparatus generates the terminal specific message including the conventional mobility parameter as illustrated in FIG. 5A (S110).

Mobility parameter generator 332 of the HO source base station apparatus transmits the terminal specific message including the conventional mobility parameter to another terminal, which is under control of the HO source base station apparatus and located in the cell (S111).

According to the present exemplary embodiment, even if the terminal located at the cell edge of the cell of the base station apparatus is the low-speed terminal, the base station apparatus sets the high-speed parameter to each parameter region of the mobility parameter, so that the terminal can use the high-speed parameter as the measurement parameter. The configuration enables the terminal to immediately transmit the measurement report to the base station apparatus to immediately perform the handover. Therefore, the load on the base station apparatus can immediately be dispersed.

The connection of the low-speed terminal can be maintained by immediately handing over the low-speed terminal located at the cell edge when the base station apparatus in the high traffic state reduces the cell coverage in order to offload the traffic of the base station apparatus.

In the description of the present exemplary embodiment, the base station apparatus sets the high-speed parameter to each parameter region of the mobility parameter. However, the present invention is not limited to the present exemplary embodiment. For example, the parameter shorter than the high-speed parameter may be set to each parameter region of the mobility parameter when base station apparatus is in the high traffic state. In the configuration, the terminal located at the cell edge of the cell of the base station apparatus can be handed over more quickly.

Second Exemplary Embodiment

A configuration of a base station apparatus according to a second exemplary embodiment will be described below. The configuration of the base station apparatus of the present exemplary embodiment is similar to that of the base station apparatus 30 of the first exemplary embodiment in FIG. 3. However, the base station apparatus of the present exemplary embodiment differs from base station apparatus 30 of the first exemplary embodiment in a function of mobility parameter generator 332. The function of mobility parameter generator 332 of the base station apparatus according to the present exemplary embodiment will be described below.

Mobility parameter generator 332 generates, based on the determination result received from traffic determination unit 331, indicator information indicating to the terminal to use the high-speed parameter irrespective of the moving speed of the terminal, and outputs the terminal specific message including the generated indicator information to setting information transmitter 333.

Specifically, mobility parameter generator 332 generates the indicator information indicating to the terminal to use the high-speed parameter irrespective of the moving speed of the terminal when receiving the determination result indicating that the traffic amount is larger than the predetermined threshold from traffic determination unit 331. Mobility parameter generator 332 outputs the terminal specific message including the generated indicator information to setting information transmitter 333.

Mobility parameter generator 332 generates indicator information indicating to the terminal to use the parameter corresponding to the moving speed of the terminal when receiving the notification of completion of the handover from handover controller 335. Mobility parameter generator 332 outputs the terminal specific message including the generated indicator information to setting information transmitter 333.

A configuration of the terminal of the present exemplary embodiment will be described below. The configuration of the terminal of the present exemplary embodiment is similar to that of terminal 40 of the first exemplary embodiment in FIG. 4. However, the terminal of the present exemplary embodiment differs from terminal 40 of the first exemplary embodiment in a function of measurement parameter setting unit 422. The function of measurement parameter setting unit 422 of the terminal according to the present exemplary embodiment will be described below.

Measurement parameter setting unit 422 sets the measurement parameter based on the moving speed of the terminal, which is received from a moving speed determination unit (not illustrated), the indicator information included in the received terminal specific message, and the mobility parameter. Measurement parameter setting unit 422 may use the mobility parameter received in the past when the mobility parameter is not included in the received terminal specific message. The mobility parameter of the present exemplary embodiment is conventional mobility parameter 51 in FIG. 5A.

Measurement parameter setting unit 422 sets the high-speed parameter to the measurement parameter irrespective of the moving speed received from the moving speed determination unit (not illustrated) when receiving the indicator information indicating to the terminal to use the high-speed parameter irrespective of the moving speed of the terminal.

Measurement parameter setting unit 422 sets the measurement parameter based on the moving speed received from the moving speed determination unit (not illustrated) when receiving the indicator information indicating to the terminal to use the parameter corresponding to the moving speed of the terminal or when not receiving the indicator information.

For example, when determining that the terminal is the low-speed terminal, measurement parameter setting unit 422 sets a value set to the low-speed parameter region of the mobility parameter to the measurement parameter. When determining that the terminal is the medium-speed terminal, measurement parameter setting unit 422 sets a value set to the medium-speed parameter region of the mobility parameter to the measurement parameter. When determining that the terminal is the high-speed terminal, measurement parameter setting unit 422 sets a value set to the high-speed parameter region of the mobility parameter to the measurement parameter.

Measurement parameter setting unit 422 outputs the set measurement parameter to reception quality measurement and report condition determination unit 423.

A procedure of handover processing when the base station apparatus in the high traffic state hands over the terminal located at the cell edge onto the neighbour base station apparatus in the present exemplary embodiment will be described below.

Figure 7:
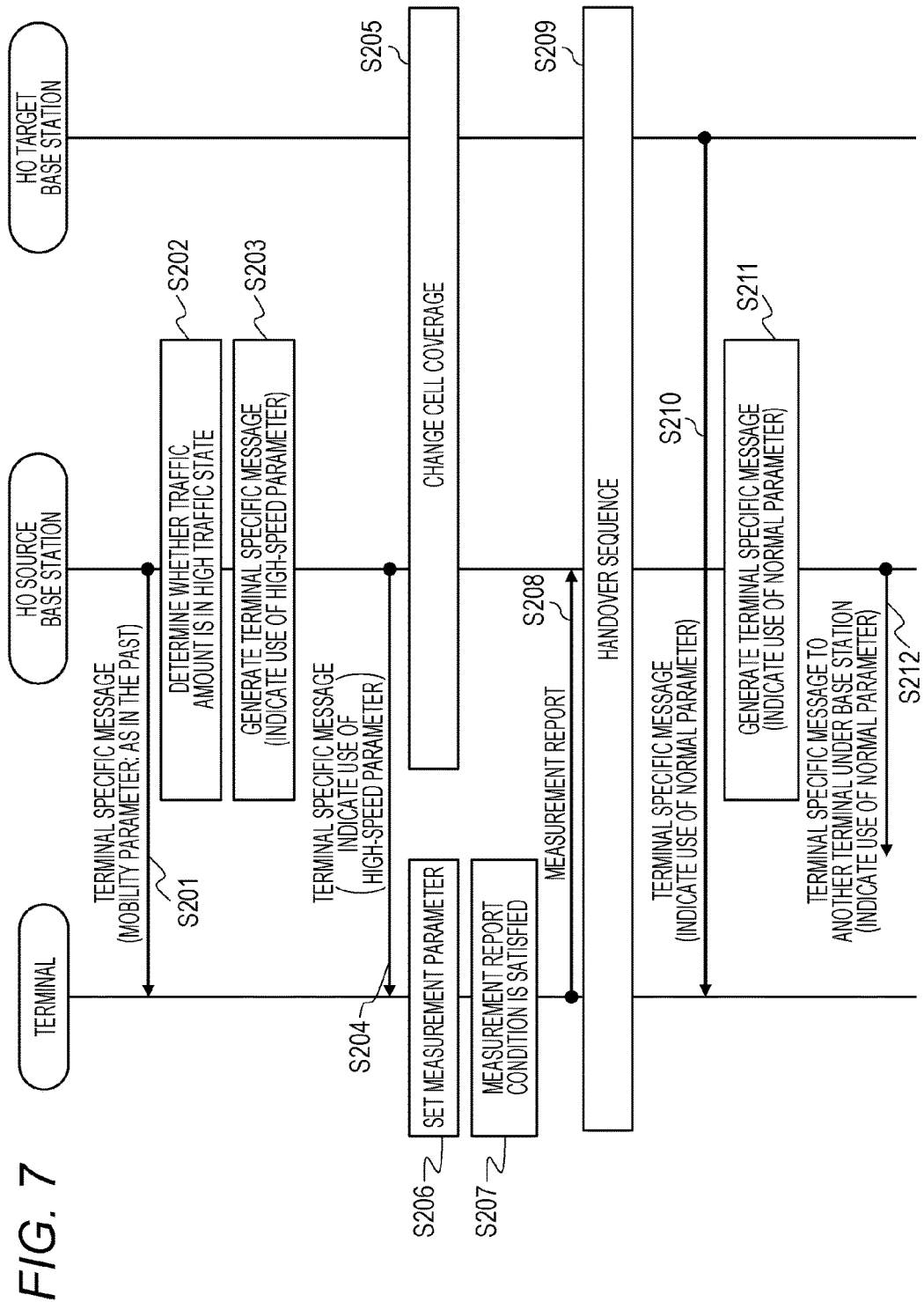
FIG. 7 is a sequence diagram illustrating a procedure of handover processing in a second exemplary embodiment of the present invention.

FIG. 7 is a sequence diagram illustrating an example of the procedure of the handover processing in the second exemplary embodiment of the present invention. FIG. 7 illustrates processing procedures of a terminal, a base station apparatus (in FIG. 7, HO (handover) source base station apparatus) connected to the terminal, and a base station apparatus (in FIG. 7, HO (handover) target base station apparatus) to which the terminal is newly connected by the handover. Each of the HO source base station apparatus and HO target base station apparatus in FIG. 7 has the configuration of the base station apparatus of the present exemplary embodiment, and the terminal has the configuration of the terminal of the present exemplary embodiment.

Mobility parameter generator 332 of the HO source base station apparatus generates the conventional mobility parameter in FIG. 5A, and transmits the terminal specific message including the generated mobility parameter to the terminal (S201). Measurement parameter setting unit 422 of the terminal stores the received mobility parameter. The processing in S201 may be performed when the terminal is connected to the HO source base station apparatus or in each predetermined time interval. Measurement parameter setting unit 422 of the terminal stores the latest mobility parameter every time measurement parameter setting unit 422 receives the mobility parameter.

In the example of FIG. 7, traffic determination unit 331 of the HO source base station apparatus determines that the HO source base station apparatus is in the high traffic state (S202). Traffic determination unit 331 outputs a determination result indicating that the HO source base station apparatus is in the high traffic state to mobility parameter generator 332.

Then, mobility parameter generator 332 generates the indicator information indicating to the terminal to use the high-speed parameter irrespective of the moving speed of the terminal because mobility parameter generator 332 receives the determination result indicating that the HO source base station apparatus is in the high traffic state (S203). Mobility parameter generator 332 outputs the terminal specific message including the generated indicator information to setting information transmitter 333.

Setting information transmitter 333 transmits the received terminal specific message to the terminal through terminal communication IF 32 (S204).

The HO source base station apparatus and the HO target base station apparatus transmit and receive information to and from each other, and change the cell coverage (S205). For example, as illustrated in FIG. 2, the HO source base station apparatus reduces the cell size, and the HO target base station apparatus enlarges the cell size.

Based on the indicator information received through base station communication IF 41 and setting information receiver 421, measurement parameter setting unit 422 of the terminal sets the parameter set to the parameter region corresponding to the moving speed of terminal 40 to the measurement parameter (S206). At this point, in the example of FIG. 7, measurement parameter setting unit 422 sets the high-speed parameter to the measurement parameter irrespective of the determined moving speed because measurement parameter setting unit 422 receives the indicator information indicating to the terminal to use the high-speed parameter irrespective of the moving speed of the terminal as indicated in S203 and S204.

Then, in the example of FIG. 7, reception quality measurement and report condition determination unit 423 of the terminal determines that the measurement report condition is satisfied (S207).

Measurement report generator 424 generates the measurement report. Measurement report transmitter 425 receives the measurement report from measurement report generator 424, and transmits the measurement report to the HO source base station apparatus through base station communication IF 41 (S208).

In the example of FIG. 7, because the high-speed parameter is used as the measurement parameter, in reception quality measurement and report condition determination unit 423, time until the measurement report is transmitted to the HO source base station apparatus since the determination is started becomes a relatively short time.

Handover controller 335 of the HO source base station apparatus receives the measurement report through terminal communication IF 32 and measurement report receiver 334, and performs handover sequence control (S209). At this point, handover controller 335 determines the HO target base station apparatus based on the reception quality of the neighbour base station apparatus, which is included in the measurement report. Handover controller 335 of the HO source base station apparatus performs communication with handover controller 335 of the HO target base station apparatus, transmits and receives information about the terminal to and from handover controller 335 of the HO target base station apparatus, and completes the handover of the terminal.

After the terminal is handed over from the HO source base station apparatus to the HO target base station apparatus by the completion of the handover sequence control, mobility parameter generator 332 of the HO target base station apparatus generates the terminal specific message including the indicator information indicating to the terminal to use the parameter corresponding to the moving speed of the terminal. Setting information transmitter 333 of the HO target base station apparatus transmits the terminal specific message generated by mobility parameter generator 332 to terminal 40 through terminal communication IF 32 (S210).

On the other hand, after the terminal is handed over from the HO source base station apparatus to the HO target base station apparatus by the completion of the handover sequence control, mobility parameter generator 332 of the HO source base station apparatus generates the terminal specific message including the indicator information indicating to the terminal to use the parameter corresponding to the moving speed of the terminal (S211).

Mobility parameter generator 332 of the HO source base station apparatus transmits the terminal specific message including the generated indicator information to another terminal, which is under control of the HO source base station apparatus and located in the cell (S212).

According to the present exemplary embodiment, even if the terminal located at the cell edge of the cell of the base station apparatus is the low-speed terminal, the base station apparatus transmits the indicator information indicating to the terminal to use the high-speed parameter irrespective of the moving speed of the terminal, so that the terminal can use the high-speed parameter as the measurement parameter. The configuration enables the terminal to immediately transmit the measurement report to the base station apparatus to immediately perform the handover. Therefore, the load on the base station apparatus can immediately be dispersed.

The connection of the low-speed terminal can be maintained by immediately handing over the low-speed terminal located at the cell edge when the base station apparatus in the high traffic state reduces the cell coverage in order to offload the traffic of the base station apparatus.

Additionally, in the present exemplary embodiment, the base station apparatus transmits the terminal specific message including the indicator information indicating to the terminal to use the high-speed parameter irrespective of the moving speed of the terminal. Therefore, the mobility parameter needs not to be set according to the traffic state of the base station apparatus.

Third Exemplary Embodiment

A configuration of base station apparatus 80 according to a third exemplary embodiment will be described with reference to FIG. 8.

Figure 8:
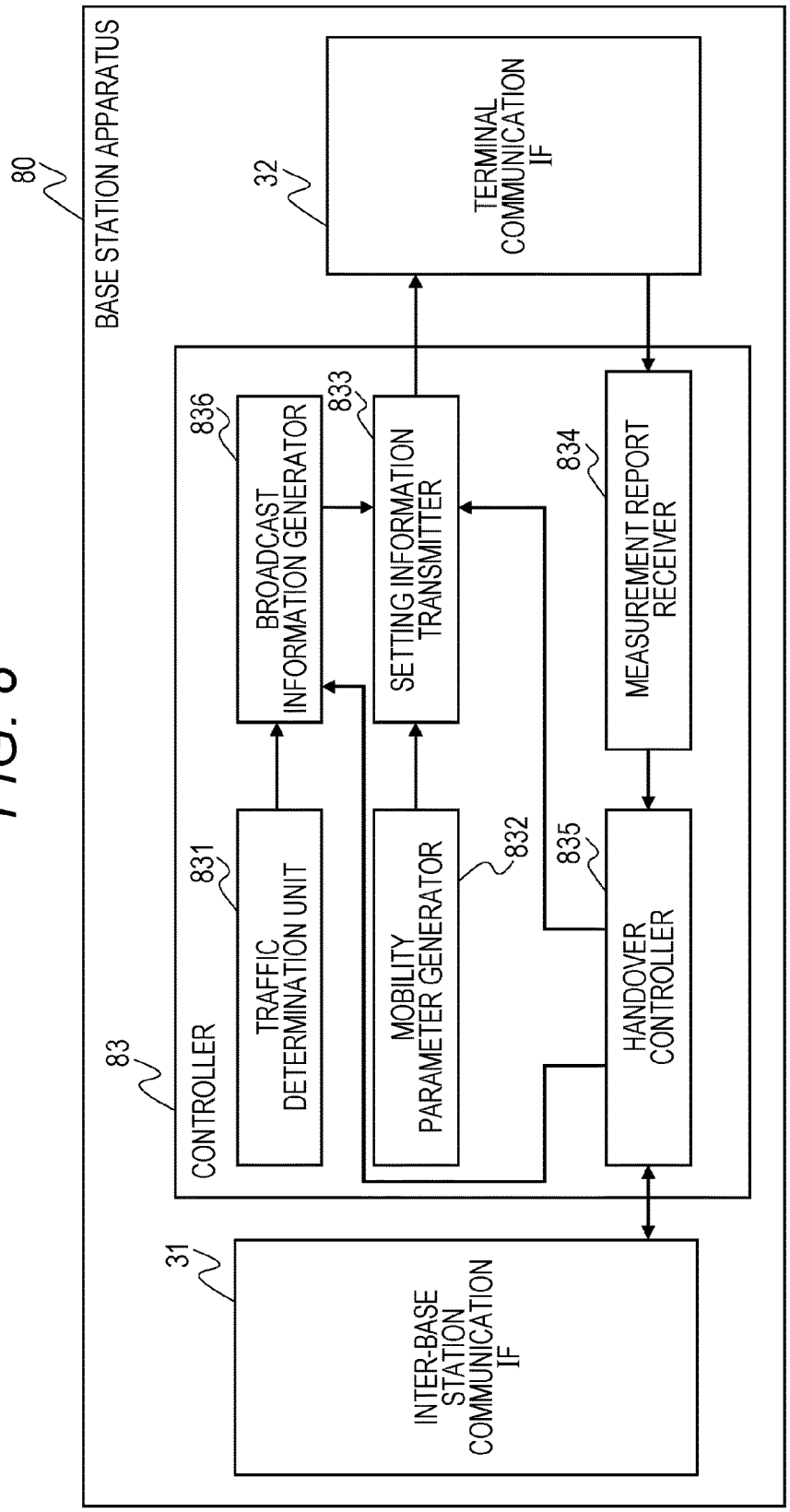
FIG. 8 is a diagram illustrating an example of a configuration of a base station apparatus according to a third exemplary embodiment of the present invention.

FIG. 8 is a diagram illustrating an example of a configuration of base station apparatus 80 according to the third exemplary embodiment of the present invention. In the configuration of FIG. 8, the configuration similar to that in FIG. 3 is designated by the identical numeral, and the description will be omitted. In base station apparatus 80 of the present exemplary embodiment, a configuration of controller 83 differs from that of controller 33 in FIG. 3.

Controller 83 includes traffic determination unit 831, mobility parameter generator 832, setting information transmitter 833, measurement report receiver 834, handover controller 835, and broadcast information generator 836.

Traffic determination unit 831 determines whether base station apparatus 80 is in the high traffic state. For example, traffic determination unit 831 compares the traffic amount accommodated in base station apparatus 80 to a predetermined threshold, and determines that base station apparatus 80 is in the high traffic state when the traffic amount is larger than the predetermined threshold. Traffic determination unit 831 outputs the determination result to broadcast information generator 836.

Mobility parameter generator 832 generates the conventional mobility parameter in FIG. 5A. Mobility parameter generator 832 outputs the terminal specific message including the generated mobility parameter to setting information transmitter 833.

Setting information transmitter 833 individually transmits the terminal specific message received from mobility parameter generator 832 to the terminal located in the cell of base station apparatus 80 through terminal communication IF 32. Setting information transmitter 833 transmits the broadcast information received from broadcast information generator 836 described later to all the terminals in the cell of base station apparatus 80 through terminal communication IF 32.

Measurement report receiver 834 receives the measurement report from the terminal through terminal communication IF 32, and outputs the received measurement report to handover controller 835.

Based on measurement report, handover controller 835 performs the handover control on the terminal to which the measurement report is transmitted. Specifically, handover controller 835 determines a handover target base station apparatus based on the reception quality of the neighbour base station apparatus, which is included in the measurement report. Handover controller 835 performs communication with handover controller 835 of the handover target base station apparatus, transmits and receives information about the terminal to be handed over to and from handover controller 835 of the handover target base station apparatus, and completes the handover of the terminal.

When the handover control is completed, handover controller 835 outputs the notification of the completion to broadcast information generator 836. Handover controller 835 receives information about the reception quality between the neighbour base station apparatus and the terminal through inter-base station communication IF 31, and outputs the received information to setting information transmitter 833.

Broadcast information generator 836 generates the indicator information indicating to the terminal to use the high-speed parameter irrespective of the moving speed of the terminal when receiving the determination result indicating that the traffic amount is larger than the predetermined threshold from traffic determination unit 831. Broadcast information generator 836 outputs the broadcast information including the generated indicator information to setting information transmitter 833.

Broadcast information generator 836 generates the indicator information indicating to the terminal to use the parameter corresponding to the moving speed of the terminal when receiving the notification of completion of the handover from handover controller 835. Broadcast information generator 836 outputs the broadcast information including the generated indicator information to setting information transmitter 833.

A configuration of the terminal of the present exemplary embodiment will be described below. The configuration of the terminal of the present exemplary embodiment is similar to that of terminal 40 of the first exemplary embodiment in FIG. 4. However, the terminal of the present exemplary embodiment differs from terminal 40 of the first exemplary embodiment in functions of setting information receiver 421 and measurement parameter setting unit 422. The functions of setting information receiver 421 and measurement parameter setting unit 422 of the terminal according to the present exemplary embodiment will be described below.

Setting information receiver 421 of the terminal of the present exemplary embodiment receives the setting information, which is transmitted from base station apparatus 80, through base station communication IF 41. For example, setting information receiver 421 receives the terminal specific message including the mobility parameter as the setting information. Setting information receiver 421 outputs the terminal specific message including the received mobility parameter to measurement parameter setting unit 422.

Setting information receiver 421 of the terminal of the present exemplary embodiment also receives the broadcast information including the indicator information as the setting information. Setting information receiver 421 outputs the broadcast information including the received indicator information to measurement parameter setting unit 422.

Measurement parameter setting unit 422 determines the moving speed of terminal 40. Because the specific determination method is similar to that of the first exemplary embodiment, the description will be omitted.

Measurement parameter setting unit 422 sets the measurement parameter based on the determined moving speed, the mobility parameter included in the received terminal specific message, and the indicator information included in the received broadcast information. Measurement parameter setting unit 422 may use the mobility parameter received in the past when not receiving the terminal specific message including the mobility parameter. The mobility parameter of the present exemplary embodiment is conventional mobility parameter 51 in FIG. 5A.

Measurement parameter setting unit 422 sets the high-speed parameter to the measurement parameter irrespective of the determined moving speed when receiving the indicator information indicating to the terminal to use the high-speed parameter irrespective of the moving speed of the terminal.

Measurement parameter setting unit 422 sets the measurement parameter based on the determined moving speed when receiving or not receiving the indicator information indicating to the terminal to use the parameter corresponding to the moving speed of the terminal.

For example, when determining that the terminal is the low-speed terminal, measurement parameter setting unit 422 sets a value set to the low-speed parameter region of the mobility parameter to the measurement parameter. When determining that the terminal is the medium-speed terminal, measurement parameter setting unit 422 sets a value set to the medium-speed parameter region of the mobility parameter to the measurement parameter. When determining that the terminal is the high-speed terminal, measurement parameter setting unit 422 sets a value set to the high-speed parameter region of the mobility parameter to the measurement parameter.

Measurement parameter setting unit 422 outputs the set measurement parameter to reception quality measurement and report condition determination unit 423.

A procedure of handover processing when the base station apparatus in the high traffic state hands over the terminal located at the cell edge onto the neighbour base station apparatus in the present exemplary embodiment will be described below.

Figure 9:
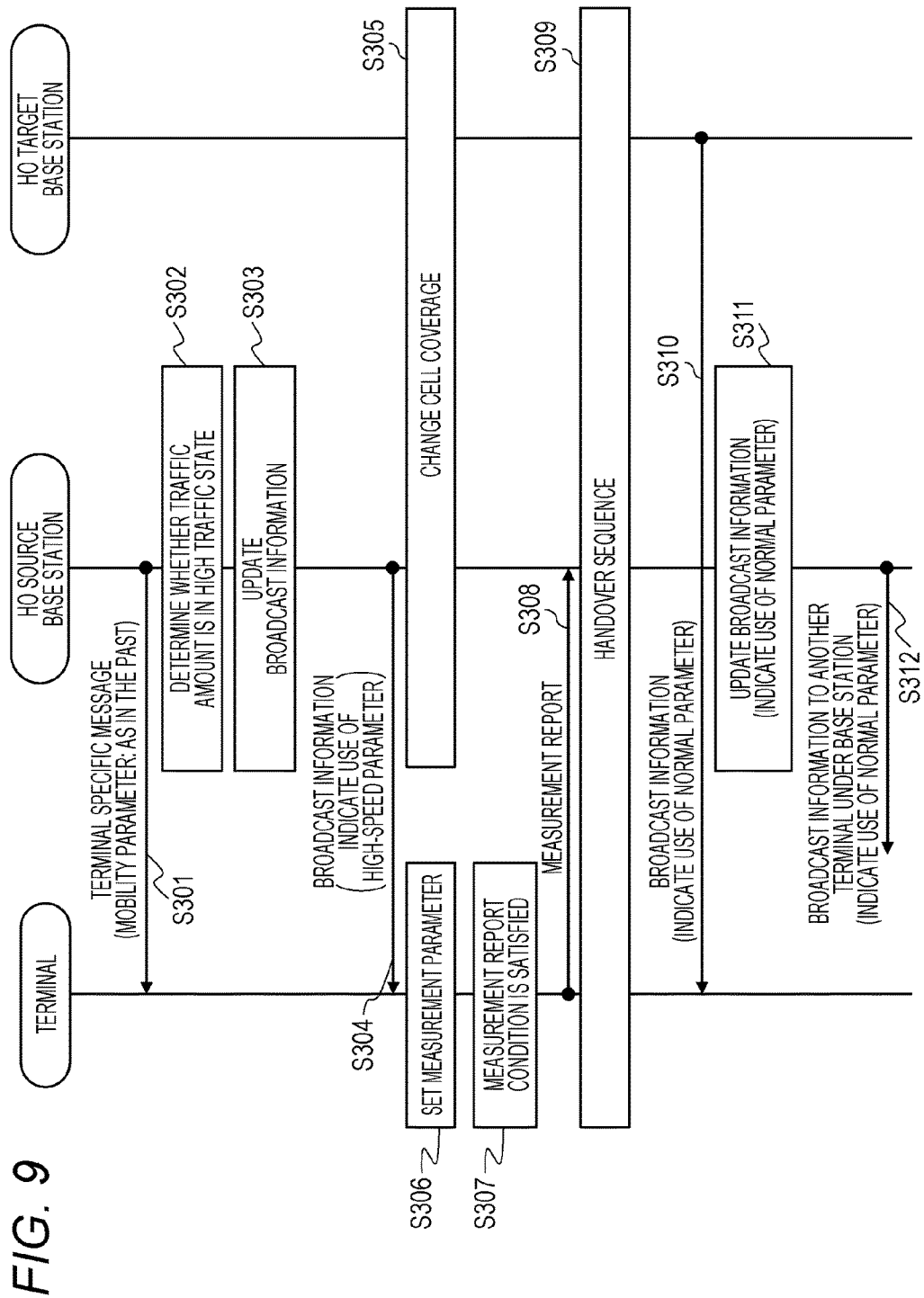
FIG. 9 is a sequence diagram illustrating a procedure of handover processing in the third exemplary embodiment of the present invention.

FIG. 9 is a sequence diagram illustrating an example of the procedure of the handover processing in the third exemplary embodiment of the present invention. FIG. 9 illustrates processing procedures of a terminal, a base station apparatus (in FIG. 9, HO (handover) source base station apparatus) connected to the terminal, and a base station apparatus (in FIG. 9, HO (handover) target base station apparatus) to which the terminal is newly connected by the handover. Each of the HO source base station apparatus and HO target base station apparatus in FIG. 9 has the configuration of base station apparatus 80 of the present exemplary embodiment, and the terminal has the configuration of the terminal of the present exemplary embodiment. Mobility parameter generator 832 of the HO source base station apparatus generates the conventional mobility parameter in FIG. 5A, and transmits the terminal specific message including the generated mobility parameter to the terminal (S301). Measurement parameter setting unit 422 of the terminal stores the received mobility parameter. The processing in S301 may be performed when the terminal is connected to the HO source base station apparatus or in each predetermined time interval. Measurement parameter setting unit 422 of the terminal stores the latest mobility parameter every time measurement parameter setting unit 422 receives the mobility parameter.

In the example of FIG. 9, traffic determination unit 831 of the HO source base station apparatus determines that the HO source base station apparatus is in the high traffic state (S302). Traffic determination unit 831 outputs the determination result indicating that the HO source base station apparatus is in the high traffic state to broadcast information generator 836.

Then, because broadcast information generator 836 receives the determination result indicating that the HO source base station apparatus is in the high traffic state, broadcast information generator 836 generates the indicator information indicating to the terminal to use the high-speed parameter irrespective of the moving speed of the terminal, and updates the broadcast information such that the broadcast information includes the generated indicator information (S303). Broadcast information generator 836 outputs the broadcast information including the generated indicator information to setting information transmitter 833.

Setting information transmitter 833 transmits the received broadcast information to all the terminals in the cell through terminal communication IF 32 (S304).

The HO source base station apparatus and the HO target base station apparatus transmit and receive information to and from each other, and change the cell coverage (S305). For example, as illustrated in FIG. 2, the HO source base station apparatus reduces the cell size, and the HO target base station apparatus enlarges the cell size.

Based on the indicator information received through base station communication IF 41 and setting information receiver 421, measurement parameter setting unit 422 of the terminal sets the parameter set to the parameter region corresponding to the moving speed of terminal 40 to the measurement parameter (S306). At this point, in the example of FIG. 9, measurement parameter setting unit 422 sets the high-speed parameter to the measurement parameter irrespective of the determined moving speed because measurement parameter setting unit 422 receives the indicator information indicating to the terminal to use the high-speed parameter irrespective of the moving speed of the terminal as indicated in S303 and S304.

Then, in the example of FIG. 9, reception quality measurement and report condition determination unit 423 of the terminal determines that the measurement report condition is satisfied (S307).

Measurement report generator 424 generates the measurement report. Measurement report transmitter 425 receives the measurement report from measurement report generator 424, and transmits the measurement report to the HO source base station apparatus through base station communication IF 41 (S308).

In the example of FIG. 9, because the high-speed parameter is used as the measurement parameter, in reception quality measurement and report condition determination unit 423, time until the measurement report is transmitted to the HO source base station apparatus since the determination is started becomes a relatively short time.

Handover controller 835 of the HO source base station apparatus receives the measurement report through terminal communication IF 32 and measurement report receiver 834, and performs handover sequence control (S309). At this point, handover controller 835 determines the HO target base station apparatus based on the reception quality of the neighbour base station apparatus, which is included in the measurement report. Handover controller 835 of the HO source base station apparatus performs communication with handover controller 835 of the HO target base station apparatus, transmits and receives information about the terminal to and from handover controller 835 of the HO target base station apparatus, and completes the handover of the terminal.

After the terminal is handed over from the HO source base station apparatus to the HO target base station apparatus by the completion of the handover sequence control, broadcast information generator 836 generates the broadcast information including the indicator information indicating to the terminal to use the parameter corresponding to the moving speed of the terminal. Setting information transmitter 833 of the HO target base station apparatus transmits the broadcast information generated by broadcast information generator 836 to all the terminals in the cell of the HO target base station apparatus through terminal communication IF 32 (S310).

On the other hand, after the terminal is handed over from the HO source base station apparatus to the HO target base station apparatus by the completion of the handover sequence control, broadcast information generator 836 of the HO source base station apparatus generates the broadcast information including the indicator information indicating to the terminal to use the parameter corresponding to the moving speed of the terminal (S311).

Setting information transmitter 833 of the HO source base station apparatus transmits the broadcast information generated by broadcast information generator 836 to all the terminals in the cell of the HO target base station apparatus through terminal communication IF 32 (S312).

According to the present exemplary embodiment, even if the terminal located at the cell edge of the cell of the base station apparatus is the low-speed terminal, the base station apparatus transmits the indicator information indicating to the terminal to use the high-speed parameter irrespective of the moving speed of the terminal, so that the terminal can use the high-speed parameter as the measurement parameter. The configuration enables the terminal to immediately transmit the measurement report to the base station apparatus to immediately perform the handover. Therefore, the load on the base station apparatus can immediately be dispersed.

The connection of the low-speed terminal can be maintained by immediately handing over the low-speed terminal located at the cell edge when the base station apparatus in the high traffic state reduces the cell coverage in order to offload the traffic of the base station apparatus.

In the present exemplary embodiment, the base station apparatus transmits the broadcast information including the indicator information indicating to the terminal to use the high-speed parameter irrespective of the moving speed of the terminal. In the configuration, the existing broadcast information transmitted periodically is used, so that a radio resource can be reduced.

In each of the above exemplary embodiments, the cell coverage is reduced in order to offload the traffic of the base station apparatus. However, the present invention is not limited to the above exemplary embodiments. Even if the cell coverage is not reduced, the load can be dispersed by immediately handing over the low-speed terminal located at the cell edge.

In the description of each of the above exemplary embodiments, the three ways of the parameters are set to the mobility parameter according to the moving speed of the terminal. However, the present invention is not limited to the above exemplary embodiments. Two ways of parameters may be set to the mobility parameter according to the moving speed of the terminal, or at least four ways of parameters may be set to the mobility parameter according to the moving speed of the terminal. Even in such cases, the base station apparatus can cause the terminal to use the high-speed parameter as the measurement parameter when being in the high traffic state. The terminal immediately transmits the measurement report to the base station apparatus to immediately perform the handover, so that the load on the base station apparatus can immediately be dispersed.

In the description of each of the above exemplary embodiments, the present invention is constructed with hardware by way of example. Alternatively, the present invention can be implemented by software in cooperation with hardware.

Each functional block used in each exemplary embodiment is typically constructed with an LSI that is an integrated circuit. Each functional block may individually be integrated into one chip, or some or all of the functional blocks may be integrated into one chip. In this case, the term of LSI is used. The LSI is also called an IC, a system LSI, a super LSI, and an ultra LSI depending on a degree of integration.

A technique of implementing the integrated circuit is not limited to the LSI, but implementation by a dedicated circuit or a general-purpose processor may be used. An FPGA (field programmable gate array) in which programming can be performed after LSI fabrication or a reconfigurable processor that can reconfigure connections and settings of circuit cells in the LSI may also be used in implementing the integrated circuit.

When an integrated circuit technology replacing the LSI by the progress of the semiconductor technology or another technology derived from the semiconductor technology emerges, the function block may be integrated using the integrated circuit technology. For example, application of biotechnology is possible.

INDUSTRIAL APPLICABILITY

The present invention is useful for the mobile communication system.

REFERENCE MARKS IN THE DRAWINGS

10, 11, 30, 80 base station apparatus
10a, 10b, 11a, 11b cell
20, 40 terminal
31 inter-base station communication IF
32 terminal communication IF
33, 42, 83 controller
41 base station communication IF
51, 55 mobility parameter
52, 56 high-speed parameter region
53, 57 medium-speed parameter region
54, 58 low-speed parameter region
331, 831 traffic determination unit
332, 832 mobility parameter generator (parameter generator)
333, 833 setting information transmitter
334, 834 measurement report receiver
335, 835 handover controller
421 setting information receiver
422 measurement parameter setting unit
423 reception quality measurement and report condition determination unit
424 measurement report generator
425 measurement report transmitter
836 broadcast information generator

The invention claimed is:

1. A base station apparatus that performs radio communication with a terminal, the base station apparatus comprising:
a traffic determination unit that determines whether a traffic amount is larger than a threshold;
a parameter generator that performs, when the traffic amount is lower than or equal to the threshold, first setting in which a parameter decreasing with increasing moving speed of the terminal is set to a plurality of parameter regions provided in a mobility parameter and respectively corresponding to a plurality of moving speeds of the terminal, and performs, when the traffic amount is larger than the threshold, second setting in which a smallest parameter in parameters set in the first setting is set to each of the plurality of parameter regions irrespective of the moving speeds of the terminal; and
a setting information transmitter that transmits a terminal specific message including the mobility parameter set by the parameter generator to the terminal.

2. The base station apparatus according to claim 1, wherein the mobility parameter has at least a high-speed parameter region where a high-speed parameter corresponding to a high-speed terminal that moves at a speed higher than a predetermined speed is set, a medium-speed parameter region where a medium-speed parameter corresponding to a medium-speed terminal that moves at a speed lower than the high-speed terminal is set, and a low-speed parameter region where a low-speed parameter corresponding to a low-speed terminal that moves at a speed lower than the medium-speed terminal is set, and the parameter generator sets the high-speed parameter to the medium-speed parameter region and the low-speed parameter region when the traffic amount is larger than the threshold.

3. The base station apparatus according to claim 1, wherein the parameter set to the plurality of parameter regions indicates time until the terminal notifies the base station apparatus of a reception quality result indicating reception quality measured by the terminal since the reception quality satisfies a predetermined condition.

4. The base station apparatus according to claim 1, further comprising:
- a receiver that receives the reception quality result from the terminal; and
- a handover controller that controls handover of the terminal based on the reception quality result.

5. The base station apparatus according to claim 4, wherein the handover controller reduces a cell coverage of the base station apparatus.

6. A base station apparatus that performs radio communication with a terminal, the base station apparatus comprising:
- a traffic determination unit that determines whether a traffic amount is larger than a threshold;
- a parameter generator that generates, when the traffic amount is larger than the threshold, indicator information indicating to the terminal to use a parameter set to a parameter region corresponding to a highest moving speed in mobility parameters to which a parameter decreasing with increasing moving speed of the terminal is set to a plurality of parameter regions respectively corresponding to a plurality of moving speeds of the terminal; and
- a setting information transmitter that transmits the indicator information to at least one terminal.

7. The base station apparatus according to claim 6, wherein the mobility parameter has at least a high-speed parameter region where a high-speed parameter corresponding to a high-speed terminal that moves at a speed higher than a predetermined speed is set, a medium-speed parameter region where a medium-speed parameter corresponding to a medium-speed terminal that moves at a speed lower than the high-speed terminal is set, and a low-speed parameter region where a low-speed parameter corresponding to a low-speed terminal that moves at a speed lower than the medium-speed terminal is set, and the parameter generator generates the indicator information indicating to the terminal to use the high-speed parameter set to the mobility parameter when the traffic amount is larger than the threshold.

8. The base station apparatus according to claim 6, wherein the indicator information is included in broadcast information which is transmitted to all the terminals that perform radio communication with the base station apparatus.

9. The base station apparatus according to claim 6, wherein the indicator information is included in a terminal specific message, which is transmitted to the terminal located at a cell edge of the base station apparatus.

10. The base station apparatus according to claim 6, wherein the parameter set to the plurality of parameter regions indicates time until the terminal notifies the base station apparatus of a reception quality result indicating reception quality measured by the terminal since the reception quality satisfies a predetermined condition.

11. The base station apparatus according to claim 6, further comprising:
- a receiver that receives the reception quality result from the terminal; and
- a handover controller that controls handover of the terminal based on the reception quality result.

12. The base station apparatus according to claim 11, wherein the handover controller reduces a cell coverage of the base station apparatus.

13. A communication method in a base station apparatus that performs radio communication with a terminal, the communication method comprising:
- determining whether a traffic amount is larger than a threshold;
- performing, when the traffic amount is lower than or equal to the threshold, first setting in which a parameter decreasing with increasing moving speed of the terminal is set to a plurality of parameter regions provided in a mobility parameter and respectively corresponding to a plurality of moving speeds of the terminal, and performing, when the traffic amount is larger than the threshold, second setting in which a smallest parameter in parameters set in the first setting is set to each of the plurality of parameter regions irrespective of the moving speeds of the terminal; and
- transmitting a terminal specific message including the mobility parameter thus set to the terminal.

14. A communication method in a base station apparatus that performs radio communication with a terminal, the communication method comprising:
- determining whether a traffic amount is larger than a threshold;
- generating, when the traffic amount is larger than the threshold, indicator information indicating to the terminal to use a parameter set to a parameter region corresponding to a highest moving speed in mobility parameters in which a parameter decreasing with increasing moving speed of the terminal is set to a plurality of parameter regions respectively corresponding to a plurality of moving speeds of the terminal; and
- transmitting the indicator information to at least one terminal.

* * * * *